United States Patent [19]

Beach

[11] Patent Number: 4,875,637

[45] Date of Patent: Oct. 24, 1989

[54] FILM CASSETTE

[75] Inventor: David E. Beach, Stowe, Vt.

[73] Assignee: Eastman Kodak Company, Rochester, N.Y.

[21] Appl. No.: 296,467

[22] Filed: Jan. 12, 1989

[51] Int. Cl.[4] .............................................. G03B 17/26
[52] U.S. Cl. .................................... 242/71.1; 354/275
[58] Field of Search ...................... 242/71, 71.1, 71.8, 242/71.9; 354/275

[56] References Cited

U.S. PATENT DOCUMENTS

| | | | |
|---|---|---|---|
| 3,695,160 | 10/1972 | Stockdale | 95/ |
| 4,148,449 | 4/1979 | Kluczynski | 242/ |
| 4,200,247 | 4/1980 | Kluczynsti et al. | 242/ |
| 4,335,948 | 6/1982 | Cocco | 354/ |
| 4,407,579 | 10/1983 | Huff | 354/ |
| 4,423,943 | 1/1984 | Gold | 354/ |
| 4,445,768 | 5/1984 | Gold | 354/275 |
| 4,482,232 | 11/1984 | Englesmann et al. | 354/ |

Primary Examiner—Stuart S. Levy
Assistant Examiner—Steven M. duBois
Attorney, Agent, or Firm—Roger A. Fields

[57] ABSTRACT

A film cassette is disclosed wherein a film spool having a filmstrip coiled about it is rotatable in an unwinding direction to automatically advance a leader portion of the filmstrip along a film passage slit to the outside of the cassette shell, preparatory to initial film exposure, and is rotatable in a rewinding direction to wind the leader portion to the inside of the shell, following complete film exposure, at least until a leading end of the leader portion is positioned inward of the slit. The cassette shell includes first integral guide means, protruding from an inner circumferential wall of the shell to a predetermined location proximate the film passage slit and an outermost convolution of the filmstrip, for guiding the leading end of the leader portion between the inner wall and the outermost convolution to prevent the leading end from entering the slit. Second integral guide means is formed at the inner wall of the cassette shell for guiding the leading end of the leader portion directly to the first integral guide means in response to rotation of the film spool in the unwinding direction anytime after the leading end has been wound inward of the film passage slit. Thus, the leading end of the leader portion can be prevented from entering the film passage slit when the filmstrip is completely exposed, thereby avoiding the possibility of re-exposing the filmstrip.

6 Claims, 7 Drawing Sheets

FILM CASSETTE

CROSS-REFERENCE TO RELATED APPLICATIONS

Reference is made to commonly assigned copending applications Ser. No. 173,396, entitled FILM CASSETTE, and filed Mar. 25, 1988 in the names of Jeffrey C. Robertson and Mark D. Fraser, Ser. No. 193,323, entitled FILM CASSETTE, and filed May 12, 1988 in the name of Jeffrey C. Robertson, and Ser. No. 07/296,475 [our Docket No. 54,786], entitled FILM CASSETTE and filed Jan. 12, 1989, 1989 in the name of David E. Beach.

BACKGROUND OF THE INVENTION

1. Field of the Invention

The invention relates generally to the field of photography, and particularly to a film cassette containing roll film.

2. Description of the Prior Art

In conventional 35 m film manufacturers' cassettes, such as manufactured by Eastman Kodak Co. and Fuji Photo Film Co. Ltd., the filmstrip is wound on a flanged spool which is rotatably supported within a cylindrical shell. A leading or forward-most section of the filmstrip approximately 2⅜ inches long, commonly referred to as a "film leader", protrudes from a light-trapped slit or mouth of the cassette shell. One end of the spool has a short axial extension which projects from the shell, enabling the spool to be turned by hand. If the spool is initially rotated in an unwinding direction, the film roll inside the shell will tend to expand radially since the inner end of the filmstrip is attached to the spool, and the fogged leader portion protruding from the slit will remain stationary. The film roll can expand radially until a non-slipping relation is established between its outermost convolution and the inner curved wall of the shell. Once this non-slipping relation exists, there is a binding effect between the film roll and the shell which prevents further rotation of the spool in the unwinding direction. Thus, rotation of the spool in the unwinding direction cannot serve to advance the filmstrip out of the shell, and it is necessary in the typical 35 mm camera to engage the protruding leader portion to draw the filmstrip out of the shell.

A 35 mm film cassette has been proposed which, unlike conventional film cassettes, can be operated to automatically advance the filmstrip out of the cassette shell by rotating the film spool in the unwinding direction. The film leader normally does not protrude from the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner curved wall of the cassette shell. The trailing end of the filmstrip is secured to the film spool, and the forward or leading end of the filmstrip is reduced in width to allow it to protrude from between the circumferential lips and rest against the shell wall at a location inwardly of a film passageway to the outside of the cassette shell. During initial unwinding rotation of the film spool, the leading end of the filmstrip, regardless of its original location within the cassette shell, is required to "seek" the interior entrance to the film passageway. Then, it is advanced into and through the film passageway to exit the cassette shell. If the filmstrip is rewound midroll into the cassette shell, i.e. before all of its available imaging areas have been exposed, because the photographer wishes to change the film type, the film leader will be returned to its original location inwardly of the film passageway. Then, in order to re-use the filmstrip to expose its remaining imaging areas, the leading end of the film leader will be required again to seek the interior entrance to the film passageway to exit the cassette shell.

In conventional 35 mm film manufacturers' cassettes, after the filmstrip is completely exposed, the film spool is rotated in a rewinding direction to wind the film leader into the cassette shell. Since the film leader cannot subsequently be advanced out of the cassette shell (because of the binding effect between the film roll and the shell), this usually serves as an indication that the filmstrip is completely exposed. Conversely, in the film cassette disclosed in U.S. Pat. No. 4,423,943, the film leader can always be advanced out of the cassette shell simply by rotating the film spool in the unwinding direction. This can be done regardless of whether the filmstrip is unexposed or completely exposed. Thus, the problem exists that a filmstrip which is completely exposed may inadvertently be re-used.

The Cross-Referenced Applicatins

Like the type of film cassette disclosed in U.S. Pat. No. 4,423,923, cross-referenced applications Ser. Nos. 173,396 and 193,323 each disclose a film cassette that contains a non-protruding film leader which is automatically advanced into and through a film passageway to the outside of the cassette shell in response to initial rotation of the film spool in the unwinding direction. Conversely, cross-referenced application Ser. No. 07/296,475 [our Docket No. 54786] discloses a film cassette which is similar to the ones disclosed in the other applications except that the film leader is normally releasably engaged within the film passageway. Thus, the film leader is not required to seek the interior entrance to the film passageway when the film spool is rotated in the unwinding direction.

SUMMARY OF THE INVENTION

The invention advantageously solves the problems described above in connection with U.S. Pat. No. 4,423,923 by providing an improved film cassette wherein a film spool having a filmstrip coiled about it is rotatable in an unwinding direction to automatically advance a leader portion of the filmstrip along a film passage slit to the outside of the cassette shell, preparatory to initial film exposure, and is rotatable in a rewinding direction to wind the leader portion to the inside of the shell at least until a leading end of the leader portion is positioned inward of the slit, following complete film exposure, and wherein the improvement comprises:

said cassette shell includes first integral guide means, protruding from an inner circumferential wall of the shell to a predetermined location proximate an interior entrance to the film passage slit and an outermost convolution of the filmstrip, for guiding said leading end of the leader portion between the inner wall and the outermost convolution to prevent the leading end from entering the slit, and second integral guide means for guiding said leading end directly to the first integral guide means in response to rotation of the film spool in the unwinding direction anytime after the leading has been wound inward of the slit. Thus, the leading end of the leader portion will be prevented from entering the film passage slit when the filmstrip is completely exposed, thereby avoiding the possibility of re-exposing the filmstrip.

More particularly, the film cassette further comprises film engaging means extending into the film passage slit for releasably securing the leader portion within the slit, before the leader portion is advanced from the slit, preparatory to initial film exposure. The first integral guide means includes a relatively sharp lip-like portion arranged at said predetermined location proximate the film passage slit and the outermost convolution of the filmstrip to separate the leader portion and the outermost convolution when the leader portion is secured in the slit. The second integral guide means includes an arcuate concavity formed at the inner circumferential wall of the cassette shell to receive the leading end of the leader portion only after the leader portion has been wound inward of the film passage slit, following complete film exposure, to guide the leading end between the lip-like portion and the outermost convolution in response to any rotation of the film spool in the unwinding direction. Thus, the leading end will be prevented from entering the film passage slit to again exit the cassette shell.

DETAILED DESCRIPTION OF THE PREFERRED EMBODIMENT

The invention is disclosed as being embodied preferably in a 35 mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
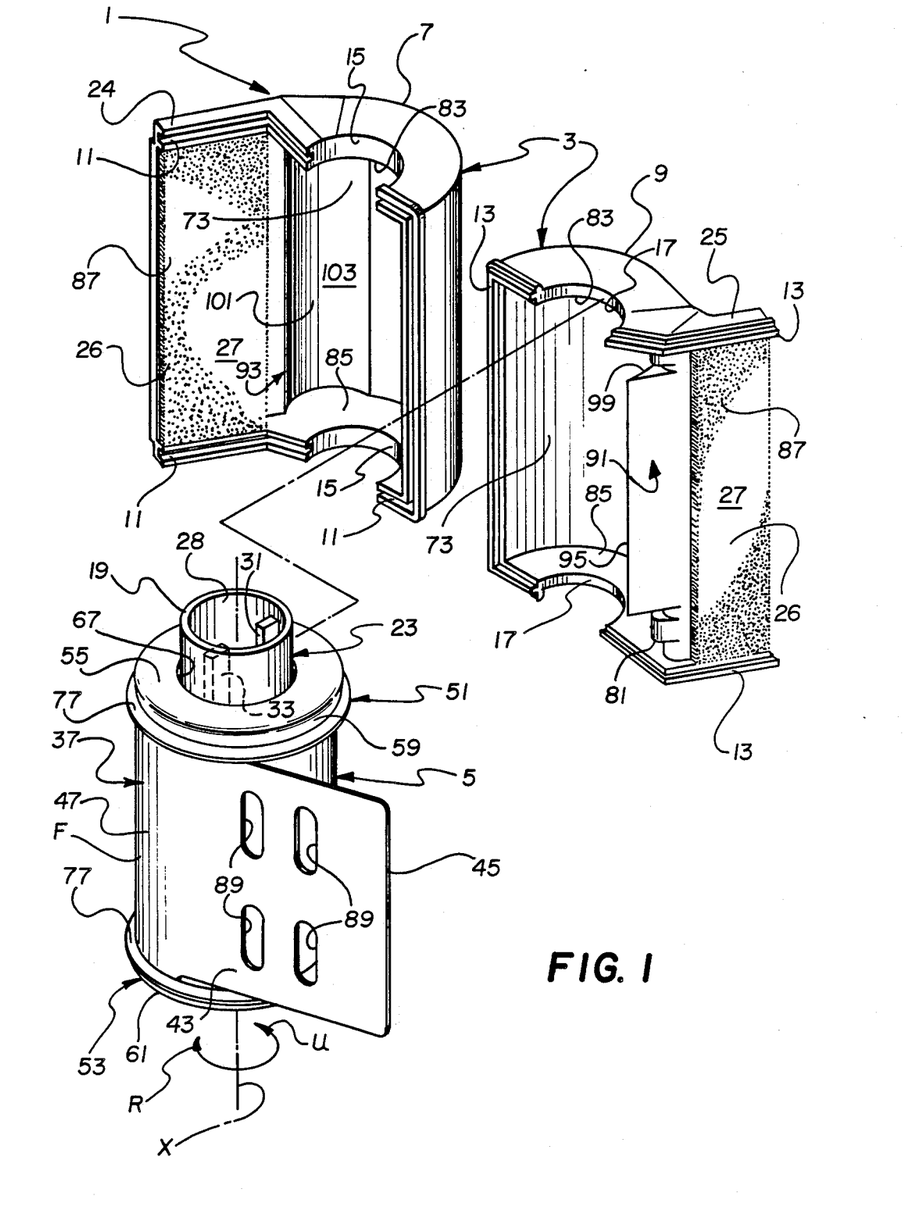
FIG. 1 is an exploded perspective view of an improved film cassette according to a preferred embodiment of the invention.
Figure 2:
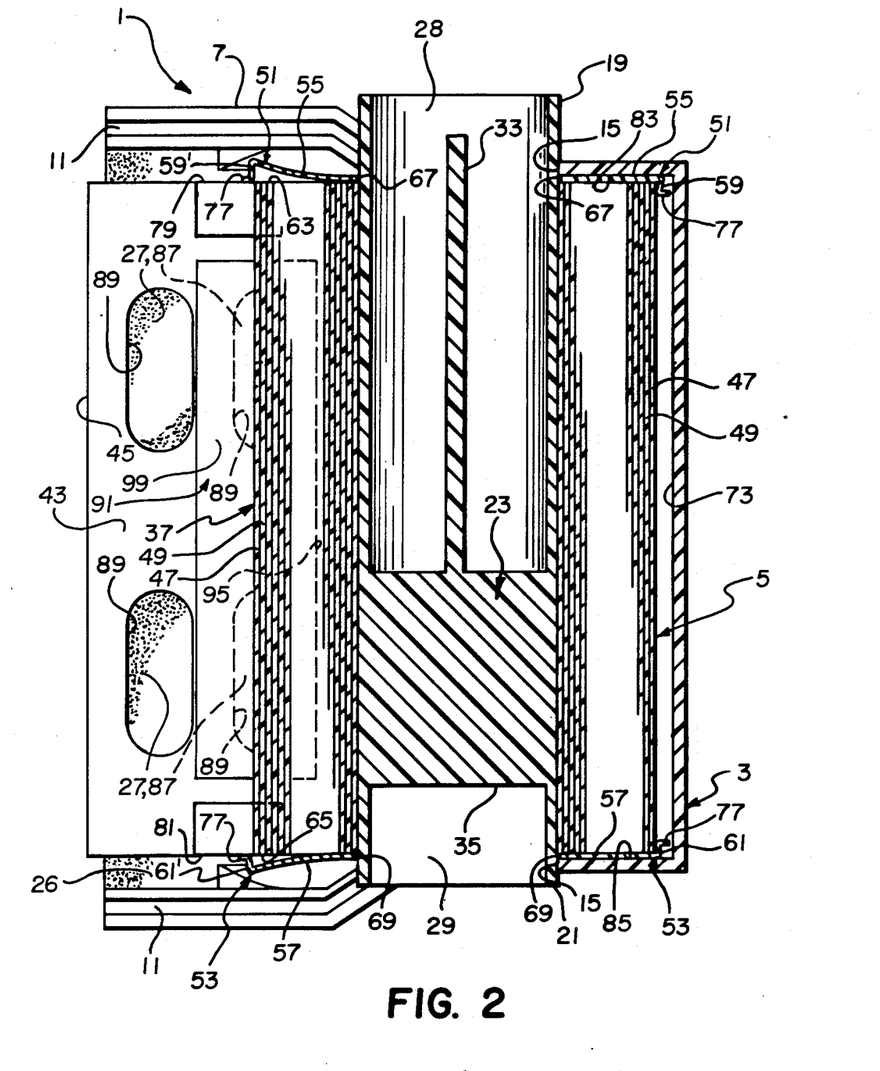
FIG. 2 is an elevation view in crosssection of the improved film cassette, showing the filmstrip prior to its initial advance from the cassette shell.
Figure 3:
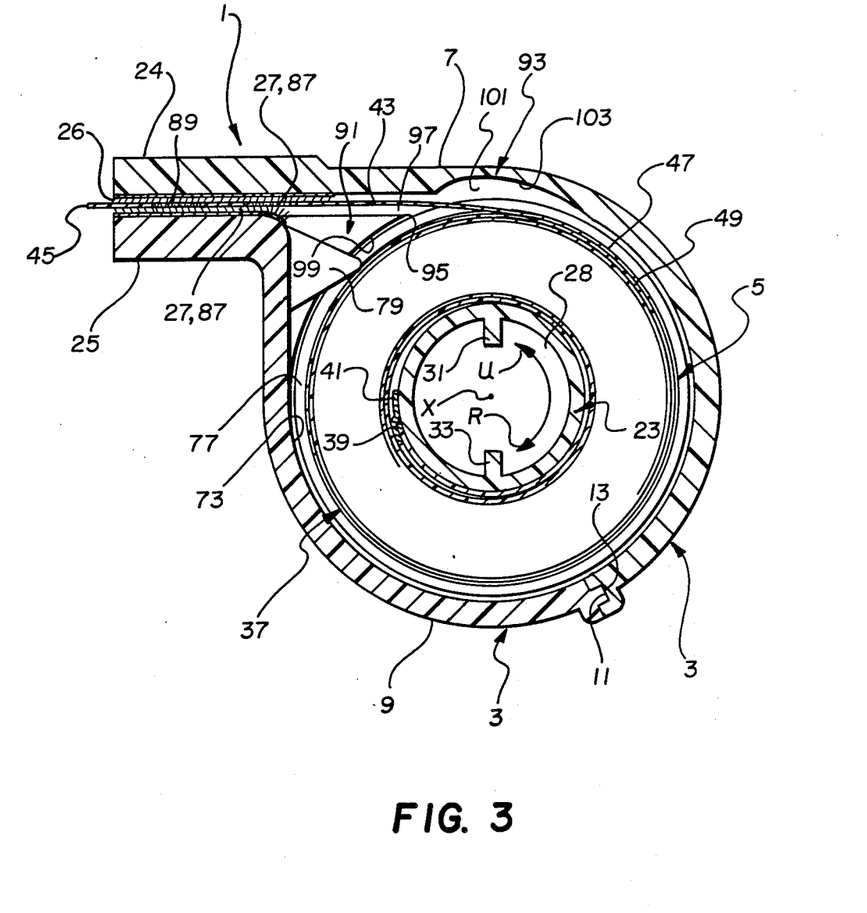
FIG. 3 is an end view in cross-section of the improved film cassette, similar to FIG. 2.

Referring now to the drawings, FIGS. 1-3 depict an improved 35 mm film cassette 1 comprising a light-tight cassette shell 3 and a film spool 5 which is rotatable about an axis X within the cassette shell. The cassette shell 3 consists of two shell halves 7 and 9 which are mated along respective grooved and stepped edge portions 11 and 13. The mated halves 7 and 9 define upper and lower aligned openings 15 and 17 for relatively longer and shorter opposite end extensions 19 and 21 of a spool core or hub 23. Also, between respective parallel throat portions 24 and 25 of the mated halves 7 and 9, there is defined a light-trapped film passage slit 26. The light-trapping means for preventing ambient light from entering the film passage slit 26 is a pile-like material 27, such as black velvet or black plush, which lines the interior of the slit. See FIG. 1.

The spool core 23 as shown in FIGS. 1-3 includes relatively longer and shorter coaxial holes 28 and 29 opening at the respective longer and shorter opposite end extensions 19 and 21 of the spool core. A pair of spaced keying ribs 31 and 33 integrally formed with the spool core 23 are located within the longer coaxial hole 28, and a single keying rib 35 similarly formed with the spool core is located within the shorter coaxial hole 29. The several keying ribs 31, 33, and 35 according to custom may be engaged to rotate the film spool 5 in an unwinding direction indicated by the arrow U in FIG. 1, or to rotate the film spool in a rewinding direction indicated by the arrow R in the same FIG.

A roll 37 of convoluted 35 mm film F is wound about the spool core 23. As indicated in FIG. 3, the film roll 37 has an inner or trailing end 39 attached to the spool core 23 by a suitable piece of adhesive tape 41 and a film leader 43. The film leader 43 has a narrowed leading or forward end 45 and may comprise 2-3 convolutions of the film roll 37 (or it may be shorter). One of these leader convolutions is the outermost convolution 47 and another of them is the next inward succeeding convolution 49.

Figure 9:
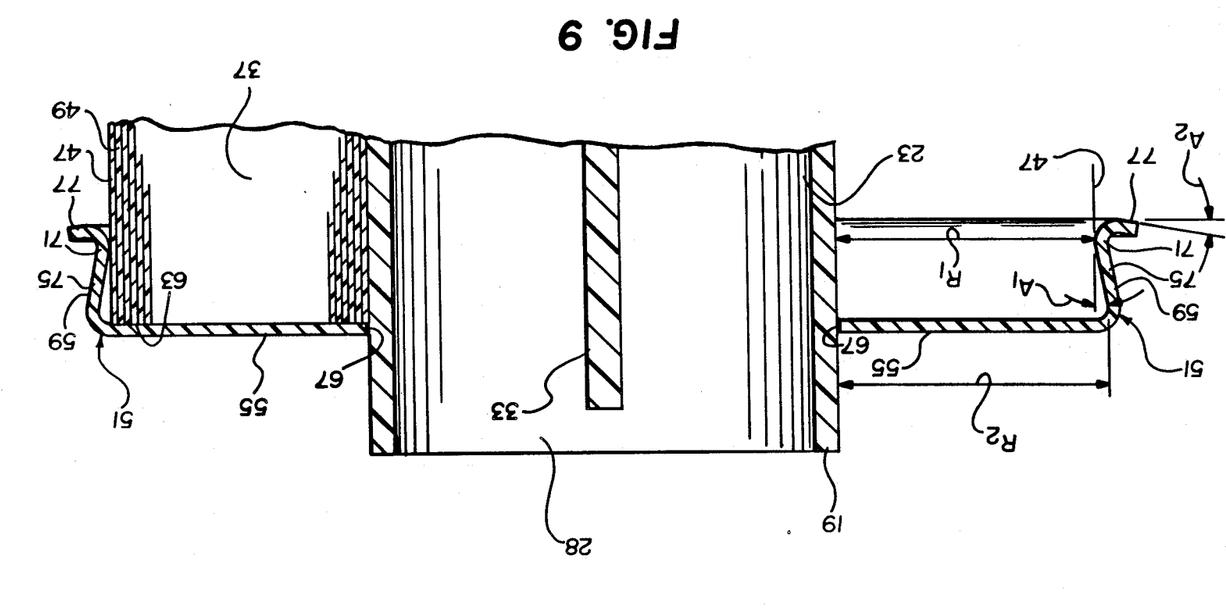
FIG. 9 is an end view in cross-section of one of a pair of flanges associated with a film spool within the cassette shell.

A pair of identical flanges 51 and 53 are coaxially spaced along the spool core 23 as shown in FIGS. 1 and 2. The two flanges 51 and 53 comprise respective integral disks 55 and 57 and respective integral annular lips or skirts 59 and 61 which circumferentially extend from the disks. The two disks 55 and 57 cover opposite sides, i.e. ends, 63 and 65 of the film roll 37 and they have respective central holes 67 and 69 through which the spool core 23 longitudinally extends to permit rotation of the spool core relative to the flanges 51 and 53. Each of the lips 59 and 61 as depicted in FIG. 9 includes the following:

(1) an annular constraining section 71 positioned relatively remote from one of the disks 55 and 57 a predetermined radial distance $R_1$ from the spool core 23 to enable each of the lips 59 and 61 to contact the outermost convolution 47 of the film roll 37, to radially confine the outermost convolution and thereby prevent the film roll from radially expanding or clock-springing against an inner curved circumferential wall 73 of the cassette shell 3;

(2) an annular relief section 75 extending from one of the disks 55 and 57 to the annular constraining section 71 of one of the lips 59 and 61 and positioned a predetermined radial distance $R_2$ from the spool core 23, greater than the radial distance $R_1$, to enable each of the lips to avoid contacting the outermost convolution 47 substantially between one of the disks and the annular constraining section; and (3) an annular free end section 77 inclined radially outwardly from the annular constraining section 71 of one of the lips 59 and 61 and away from the outermost convolution 47. The annular relief section 75 of each of the lips 59 and 61 is inclined radially inwardly from one of the disks 55 and 57 toward the outermost convolution 47 to form an acute relief angle $A_1$ with the outer most convolution. See FIG. 9. The relief angle $A_1$ may be 11°45′, for example, The annular constraining section 71 of each of the lips 59 and 61 is curved radially inwardly with respect to the film roll 37 to enable both of the lips to contact the outermost convolution 47 in a substantially tangential manner (in the vertical sense in FIG. 9) and thereby limit the area of contact between the lips and the outermost convolution. The annular free end section 77 of each of the lips 59 and 61 is tilted slightly upwardly as shown in FIG. 9 to form an acute relief angle $A_2$. The relief angle $A_2$ may be 10°, for example. Thus, as shown in FIG. 2 the lips 59 and 61 are either shaped in the form of a "Z" or an "S".

A pair of rigid identical spreader surfaces 79 and 81 are fixed to the cassette half 9 at separate locations inwardly of the film passage slit 26 as shown in FIG. 2. The respective spreader surfaces 79 and 81 deflect opposite limited portions 59′ and 61′ of the annular lips 59 and 61 axially away from each other to an axial dimension slightly exceeding the film width. See FIG. 2. In essence, the deflected portions 59′ and 61′ of the annular lips 59 and 61 are axially spaced sufficiently to prevent those portions of the lips from radially confining corresponding portions of the outermost convolutin 47 of the film roll 37. As indicated in FIG. 2, the remaining portions of the two lips 59 and 61 are maintained in place by inner semi-circular flat surfaces 83 and 85 of the cassette shell 3. The flat surfaces 83 and 95 abut the respective disks 55 and 56, except in the vicinity of the spreader surfaces 79 and 81. Thus, the remaining portions of the two lips 59 and 61 continue to radially confine the outermost convolution 47.

As shown in FIG. 2, the annular free end section 77 of each of the annular lips 59 and 61, at the deflected portions 59′ and 61′ of the two lips, bears against the respective spreader surfaces 79 and 81. Since the annular free end section 77 of each of the lips has a gentle curve to it as best seen in FIG. 9, very little wear occurs between the free end section and either of the spreader surfaces 79 and 81. The relief angle $A_2$ of the annular free end section 77 of each of the lips is useful during assembly of the film cassette 1, to position either of the spreader surfaces 79 and 81 relative to an annular free end section.

Figure 4:
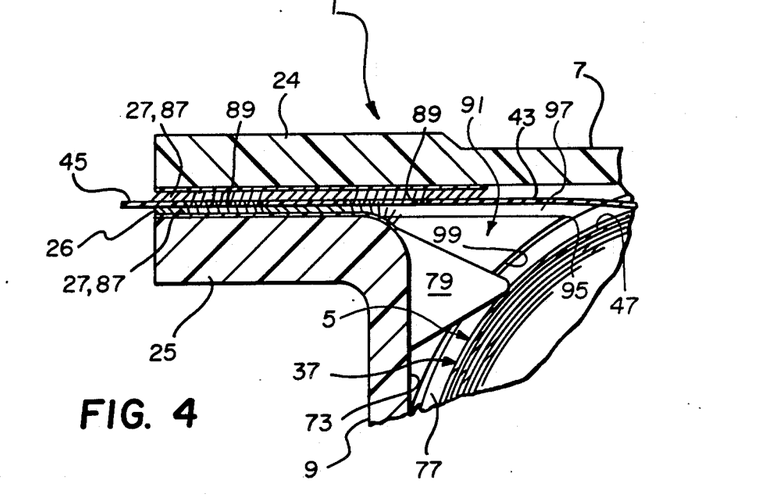
FIG. 4 is an end view similar to FIG. 3 detailing the releasable engagement of a film leader and a plush-like material within a film passage slit of the cassette shell.

The pile-like material 27 which prevents ambient light from entering the film passage slit 26 consists of short, close, fine fibers or hairs 87. See FIGS. 1 and 3–5. The film leader 43 includes two pairs of identical elongate holes 89 each dimensioned to receive a similar number of the fibers 87 to allow the fibers to engage the leader to prevent its casual creep, particularly rearward, in the film passage slit 26 as shown in FIG. 4. The fibers 87 are inclined generally towards the direction indicated by the arrow F in FIG. 5 the film leader 43 is advanced forward through the film passage slit 26 to the outside of the cassette shell 3. This facilitates disengagement of the film leader 43 from the fibers 87 when the film leader is moved initially in the direction F.

When the spool core 23 is initially rotated in the unwinding direction U, the two flanges 51 and 53 may remain substantially stationary and the film roll 37, since its inner end 39 is attached to the spool core, tends to expand radially or clock-spring to ensure a non-slipping relation between the outermost convolution 47 of the film roll and the annular lips 59 and 61 of the flanges.

Then, rotation of the spool core 23 in the same direction will similarly rotate the two flanges 51 and 53 and will urge the leading end 45 of the film leader 43 forward in the direction F within the film passage slit 26. See FIG. 5. The resistance of the film leader 43 to movement, caused by the engagement of the fibers 87 with the film leader is easily overcome at this time. In addition, the two spreader surfaces 79 and 81 will deflect successive portions 59′ and 61′ of the annular lips 59 and 61 axially away from each other as the respective portions are rotated past the spreader surfaces, thereby freeing successive portions of the outermost convolution 47 from the radial confinement of the two lips in the vicinity of the two spreader surfaces. Consequently, continued rotation of the spool core 23 will thrust the film leader 43 forward along the film passage slit 26 completely to the outside of the cassette shell 3. Then, according to custom the film leader can be wound onto a take-up spool in a 35 mm camera, not shown, and the filmstrip F exposed in the course of picture-taking.

Figure 5:
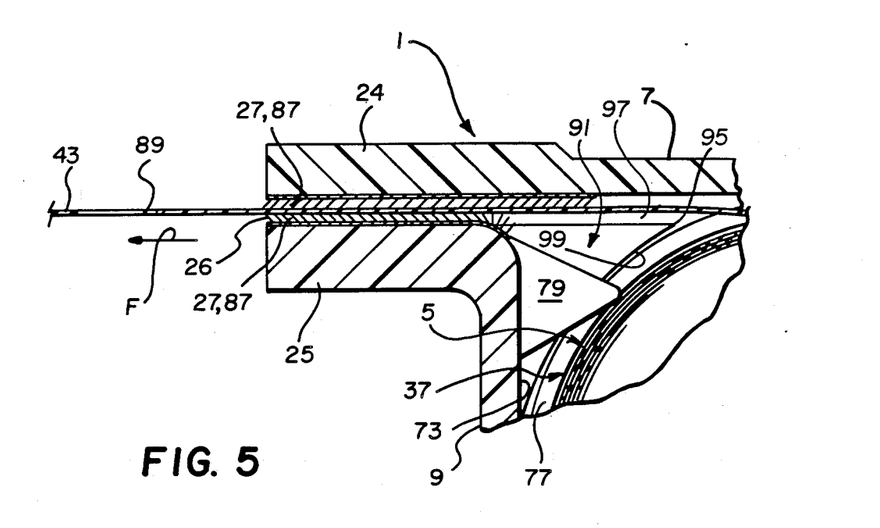
FIG. 5 is an end view similar to FIG. 4 detailing disengagement of the film leader from the plush-like material when the filmstrip is initially advanced from the cassette shell.
Figure 6:
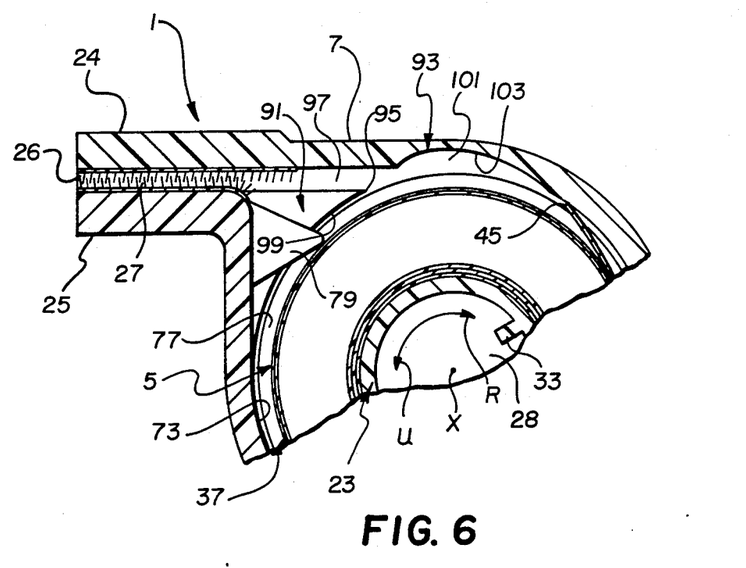
FIG. 6 is an end view similar to FIG. 3 detailing a possible position of the film leader after the filmstrip has been returned to the cassette shell.
Figure 7:
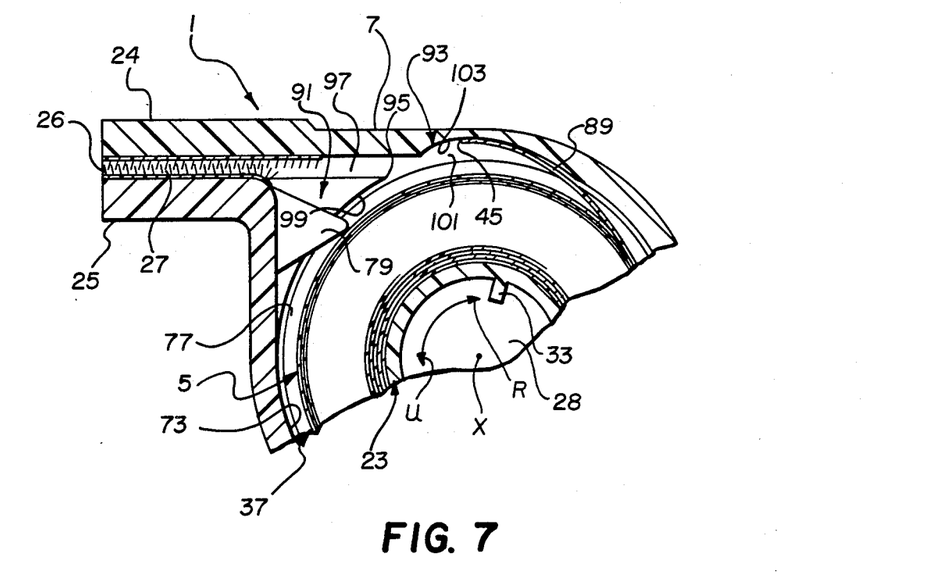
FIGS. 7 and 8 are end views similar to FIG. 6 detailing the manner in which the film leader is then prevented from exiting the cassette shell.
Figure 8:
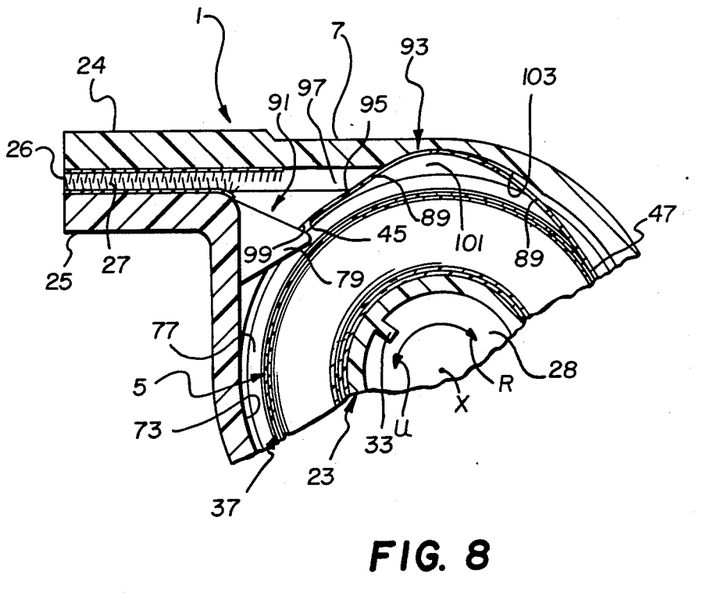

Conversely, when the spool core 23 is rotated in the rewinding direction R as shown in FIG. 6, following film exposure, the film leader 43 will eventually be wound to the inside of the film passage slit 26 to allow its leading end 45 to rest against the inner curved wall 73 of the cassette shell 3. In this connection, the cassette shell 3 includes first integral guide means 91 at the cassette half 9 for guiding the leading end 45 of the film leader 43 between the inner curved wall 73 at the cassette half 9 and the outermost convolution 47 of the film roll 37, to prevent the leading end from entering the slit, and second integral guide means 93 at the cassette half 7 for guiding the leading end directly to the first guide means in response to rotation of the spool core 23 in the unwinding direction U anytime after the leading end has been positioned inward of the slit. See FIGS. 7 and 8. Specifically, the first guide means 91 comprises a relatively sharp lip-like portion 95 arranged between an interior opening or entrance 97 to the film passage slit 26 and the outermost convolution of the film roll 37, to normally serve as a divider between the particular section of the film leader entering the interior opening and the outermost convolution as shown in FIGS. 3–5, and an elongate concave guide surface 99 connecting the lip-like portion and the inner curved wall 73 at the cassette half 9. The second guide means 93 comprises an arcuate concavity 101 formed in the inner curved wall 73 at the cassette half 7 to define an elongate curved guide surface 103 for supporting the leading end 45 of the film leader 43 to guide it between the lip-like portion 95 and the outermost convolution 47 to the guide surface 99 in response to rotation of the spool core 23 in the unwinding direction U anytime after the leading end is received in the arcuate concavity. This is sequentially illustrated in FIGS. 6–8. Thus, the leading end 45 of the film leader 43 will be prevented from entering the film passage slit 26, thereby avoiding the possibility of re-exposing the filmstrip F.

The invention has been described in detail with reference to a preferred embodiment. However, it will be appreciated that variations and modifications can be effected within the scope of the invention. For example, instead of using the fibers 87 to releasably engage the film leader 43 at the holes 89 in the leader, other engaging means such as disclosed in U.S. Pat. No. 4,482,232, granted Nov. 13, 1984, may be used.

I claim:

1. An improved film cassette wherein a film spool having a filmstrip coiled about it is rotatable in an unwinding direction to automatically advance a leader portion of said filmstrip along a film passage slit to the outside of the cassette shell and is rotatable in a rewinding direction to wind said leader portion to the inside of said shell at least until a leading end of the leader portion is positioned inward of said slit, and wherein the improvement comprises:

said cassette shell includes first integral guide means, protruding from an inner circumferential wall of the shell to a predetermined location proximate said film passage slit and an outmost convolution of said filmstrip, for guiding said leading end of the leader portion between the inner wall and said outermost convolution to prevent the leading end from entering the slit, and second integral guide means for guiding said leading end directly to said first integral guide means in response to rotation of said film spool in the unwinding direction anytime after the leading end has been wound inward of said slit, whereby said leading end will be prevented from entering the slit.

2. The improvement as recited in claim 1, further comprising:

film engaging means extending into said film passage slit for normally releasably securing said leader portion within the slit.

3. The improvement as recited in claim 2, wherein said leading end of the leader portion is adapted to rest against said inner circumferential wall of the cassette shell only after the leading end has been wound inward of said film passage slit, and said second integral guide means includes an arcuate concavity in the inner circumferential wall for receiving said leading end anytime after the leading end has been wound inward of the slit to guide the leading end directly to said first integral guide means in response to rotation of said film spool in the unwinding direction.

4. The improvement as recited in claim 2, wherein said first integral guide means includes a relatively sharp lip-like portion arranged at said predetermined location proximate said film passage slit and said outermost convolution of the filmstrip to normally separate said leader portion and the outermost convolution, and said second integral guide means includes a curved guide surface formed at said inner circumerential wall of the cassette shell for guiding said leading end of the leader portion directly between said lip-like portion and said outermost convolution in response to rotation of said film spool in the unwinding direction anytime after the leading end has been wound inward of the slit.

5. The improvement as recited in claim 4, wherein said second integral guide means includes an arcuate concavity in said inner circumferential wall of the cassette shell to define said curved guide surface for guiding said leading end of the leader portion.

6. The improvement as recited in claim 2, wherein said leading end of the leader portion is adapted to rest against said inner circumferential wall of the cassette shell only after the leading end has been wound inward of said film passage slit, said first integral guide means includes a relatively sharp lip-like portion arranged at said predetermined location to normally separate said leader portion and said outermost convolution of the filmstrip and an elongate guide surface extending intermediate said lip-like portion and the inner circumferential wall substantially in spaced curved relation with the outermost convolution, and said second integral guide means includes an arcuate concavity in said inner circumferenfial wall for supporting said leading end to guide it between the lip-like portion and said outermost convolution to said elongate guide surface in response to rotation of said film spool in the unwinding direction anytime after the leading end has been wound inward of the slit.

* * * * *